United States Patent [19]

Bjermo et al.

[11] 3,960,725
[45] June 1, 1976

[54] METHOD FOR SLUDGE TREATMENT

[75] Inventors: Gote Herbert Egard Bjermo; Paul Einar Tresjo, both of Västeras, Sweden

[73] Assignee: System AB Infoteknik, Västeras, Sweden

[22] Filed: Oct. 31, 1974

[21] Appl. No.: 519,559

[30] Foreign Application Priority Data
Nov. 5, 1973 Sweden.......................... 7314962-7

[52] U.S. Cl.............................. 210/67; 159/11 R; 159/12; 159/49; 159/DIG. 6; 210/71; 210/73 R; 210/152; 210/259; 210/294
[51] Int. Cl.²........................................ C02C 5/06
[58] Field of Search......... 159/11 R, 12, 49, DIG. 6; 210/45, 47, 50, 66, 67, 71, 73, 77, 152, 180, 182, 252, 259, 294, 402, 404; 252/317; 423/625, 628, 629

[56] References Cited
UNITED STATES PATENTS

| | | | |
|---|---|---|---|
| 2,096,176 | 10/1937 | Harrington...................... | 210/152 X |
| 2,413,420 | 12/1946 | Stephanoff...................... | 159/DIG. 6 |
| 2,487,600 | 11/1949 | Schneiderworth................ | 252/317 |
| 2,542,743 | 2/1951 | Weymouth........................ | 210/45 |
| 2,559,441 | 7/1951 | Judd.............................. | 159/11 R X |
| 2,570,532 | 10/1951 | Eisenberg et al................ | 252/317 |
| 3,163,598 | 12/1964 | Yoshihara et al................ | 210/47 |
| 3,395,221 | 7/1968 | Snyder et al.................... | 423/629 X |
| 3,559,807 | 2/1971 | Reilly............................ | 210/152 X |
| 3,575,854 | 4/1971 | Richards......................... | 210/50 |

*Primary Examiner*—Thomas G. Wyse
*Assistant Examiner*—Robert G. Mukai
*Attorney, Agent, or Firm*—Hane, Baxley & Spiecens

[57] ABSTRACT

Sludge containing metal hydroxide is first subject to a separation treatment where solid particles are removed, and then dewatered to obtain a greater concentration of the metal hydroxide. The dewatered sludge attains a thixotropic character whereupon it is applied to a carrier in a film-like manner. The film is heated and then sintered so as to achieve a metal oxide that is harmless and easily handable. The separation and dewatering steps of the process are carried out in a first apparatus having a suction drum surrounded by a filtering cloth that removes the water contained in the sludge and transfers it to a second apparatus having a rotating carrier for receiving on the circumference thereof the metal hydroxide in a film form, whereupon the film is heated during rotation of the carrier and sent to a sintering apparatus for conversion to a metal oxide in a granular or powder form.

4 Claims, 4 Drawing Figures

METHOD FOR SLUDGE TREATMENT

BACKGROUND OF THE INVENTION

Method and device for sludge treatment

The present invention relates to an automatic and continuous method of converting heavy metal hydroxides, which are an environmental hazard and are poisonous, and which are obtained in sludge from purification works for pickling, rinsing and surface-treatment plants, into heavy metal oxides in powder and/or granules.

There are many industrial processes for which fresh water is required, where the water, after having been used, contains various pollutants that are carried along with the wastewater into rivers and streams, unless they pass through municipal purification works. In special cases of pollution, it is inappropriate to allow the wastewater to be fed into municipal purification works. This applies particularly when the industrial waste contains heavy metals such as lead, copper, chromium, nickel, cadmium, zinc etc.

The metals most often occur together with acids, and then form very poisonous compounds. These compounds occur in pickling and surface-treatment processes, which require for the subsequent rinsing processes much fresh water and result in a highly polluted wastewater.

If suitable acid and metal recovery devices are not available, the used bath water is discharged into the sewer system together with the washing water.

Industries are now required, to an increasing degree, to arrange for wastewater treatment before the waste water is discharged into the municipal purification works or out into rivers and streams.

This treatment usually consists of neutralizing the acids with the aid of basic additives and with the aid of special additives (flocculation agents) to precipitate the dissolved metals in hydroxide flocks, which are either allowed to sediment in decantering vessels or are skimmed off in flotation plants, whereupon the treated water is harmless for discharge into the municipal purification works or into some river or stream.

The hydroxide sludge, which contains 96 – 98% water, is still poisonous and constitutes an environment hazard, and as simple methods of destroying the sludge are not available in the market at present, the companies have great difficulty in disposing of it. Central collection places have been arranged, to which the sludge is conveyed with tank trucks. There are, of course, risks involved in transporting considerable quantities of poison on public roads. Moreover, it is unsatisfactory that large quantities of poison are concentrated in certain places, as the risk for unintentional discharging through leakage increases as the stocks grow continuously since there is no suitable destruction equipment available.

From an environmental point of view it would be most appropriate to neutralize dangerous poisons and waste at the source, so that the residual products will be entirely harmless and, if possible, can either be subjected to recovery processes or else can be deposited among ordinary municipal waste.

SUMMARY OF THE INVENTION

According to the present invention a method for eliminating the toxicity of the metal hydroxy sludge has been achieved, according to which environmental problems which have been known for a long time are eliminated at the source.

DETAILED DESCRIPTION OF THE INVENTION

Figure 1:
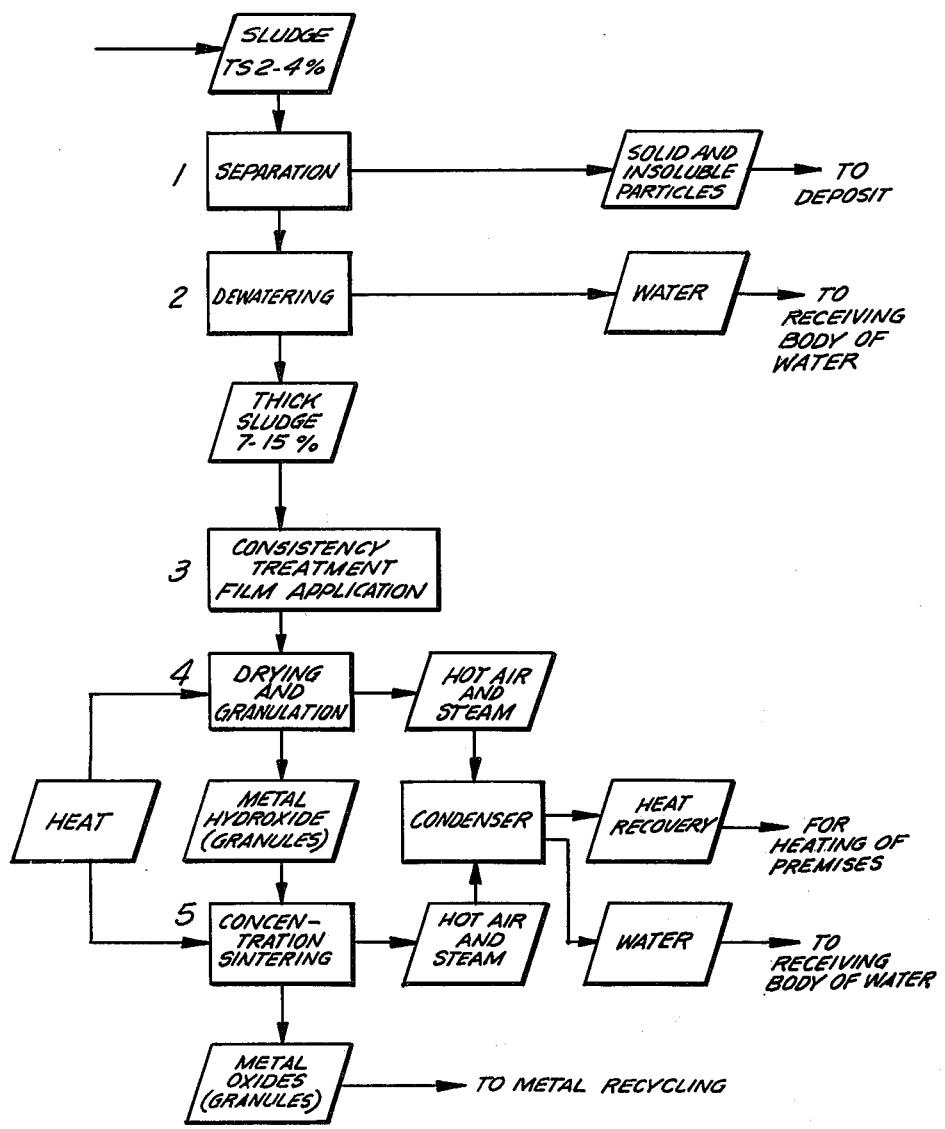
FIG. 1 is a flow chart showing the method steps of the present invention.

The method according to the invention is carried out automatically and continuously in five stages, as shown in FIG. 1.

In the first stage, the solid and insoluble particles which are of such a nature that they can be deposited among harmless industrial waste, which are contained in the metal hydroxy sludge that is to be processed, are separated. Usually a metal hydroxy sludge consists of colloidal particles that have been gathered into three-dimensional flocks. In addition to these flocks there are other particles that are conveyed with the wastewater in various ways, e.g. various kinds of dirt, via draining gutters.

In the second stage the sludge is dewatered, and the dry substance, which, at the input to the first stage constitutes 2 – 4%, increases to 7 – 15% of the weight of the thickened sludge. The dewatering is continued to such an extent that the sludge obtains and retains a thixotropic character, which is essential for the continued process according to the invention.

In the third stage the sludge is treated so that it obtains such a consistency that it can be applied in the form of a 1 – 5 mm thick film onto a media carrier, which conveys the sludge through the fourth stage, where drying takes place in such a way that metal hydroxide in a powder and/or granulated form is obtained, with grain sizes of 0.3 – 2 mm, depending on the thickness of the film in stage three.

The granules are collected and concentrated in the fifth stage, and at the same time a subsequent sintering of the metal hydroxides takes place to form, under normal conditions, harmless metal oxides which are difficult to dissolve. The metal oxides are collected in appropriate containers, either for transportation or for recovery into metal, when this can be done, depending on the metals included and profitability of recovery processes for same.

During the process, the volume of the polluted sludge included has been reduced by approx 98% to an oxide that is harmless to the environment. This constitutes an important advantage from the point of view of transportation compared with the present-day situation. The risks involved with big and expensive tank transports can thereby be eliminated.

The steam heat used in the fourth and fifth stages can be utilized by means of heat exchangers, and the condensate, together with the water obtained in the second stage, can be discharged to the receiving body of water or can be returned as process water.

In the accompanying drawing an example of an embodiment of an apparatus for carrying out the method is shown and will be described in connection therewith.

Figure 2:
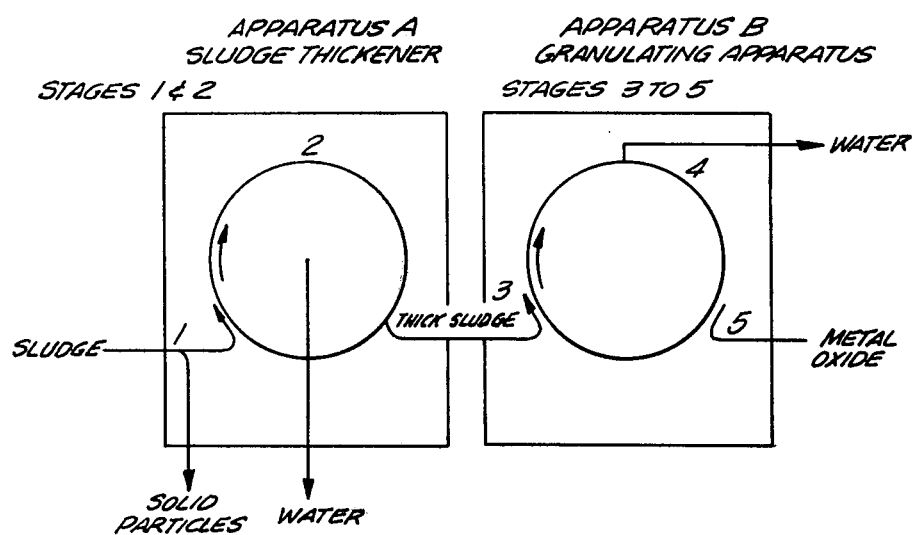
FIG. 2 is a diagrammatic view of the apparatus of the present invention.

The apparatus consists of two separate units A and B, which for the process are connected with each other, as will be noted from FIG. 2.

Unit A contains the first two stages as referred to in the description of the method, and unit B contains the other three stages.

Figure 3:
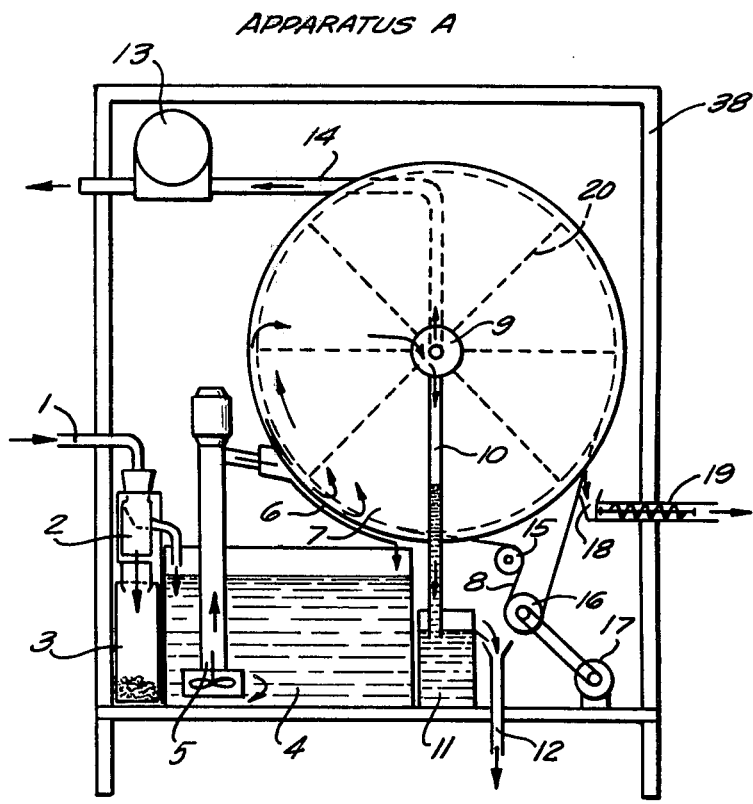
FIG. 3 is a diagrammatic side view of one of the units shown in FIG. 2.

According to FIG. 3, the device comprises a sludge feed pipe (1) and a rotating separator for solid and insoluble particles (2) together with a collection container (3) for the particles and a storage tank (4) for sludge that has been separated from solid particles. A combined agitator and centrifugal pump (5) is placed in the tank (4) and is connected with a sludge supply trough (6) which is open at its lower end to permit excess sludge which has not been sucked sufficiently dry to return to the storage tank (4) and which is at its peripheral side in sliding contact with an endless filter cloth (8) which encircles a vacuum drum (7) provided with special hole arrangements in the envelope circumference to effect uniform distribution of the vacuum on the filter cloth. This cloth together with the drum (7), is driven by a controllable motor (17) via a driving pulley (16) and a tensioning pulley (15). The drum (7) is divided into sections by means of walls (20), which collect and divert the water sucked out of the sludge to a water separator (9) located in the centre. This separator is connected with a suction pipe (14) and a vacuum pump (13) as well as a dewatering pipe (10) which also serves as a vacuum gauge and is connected with a water container (11) provided with a spillway to a discharge pipe (12) which conducts the sucked off water to the receiving body of water or to the process water stores. In connection with the drum (7) and the filter cloth (8) there is a thick-sludge scraper (18). The entire apparatus A is enclosed in a housing (38). The sludge processed in unit A is conveyed to unit B by a pipe 19.

Figure 4:
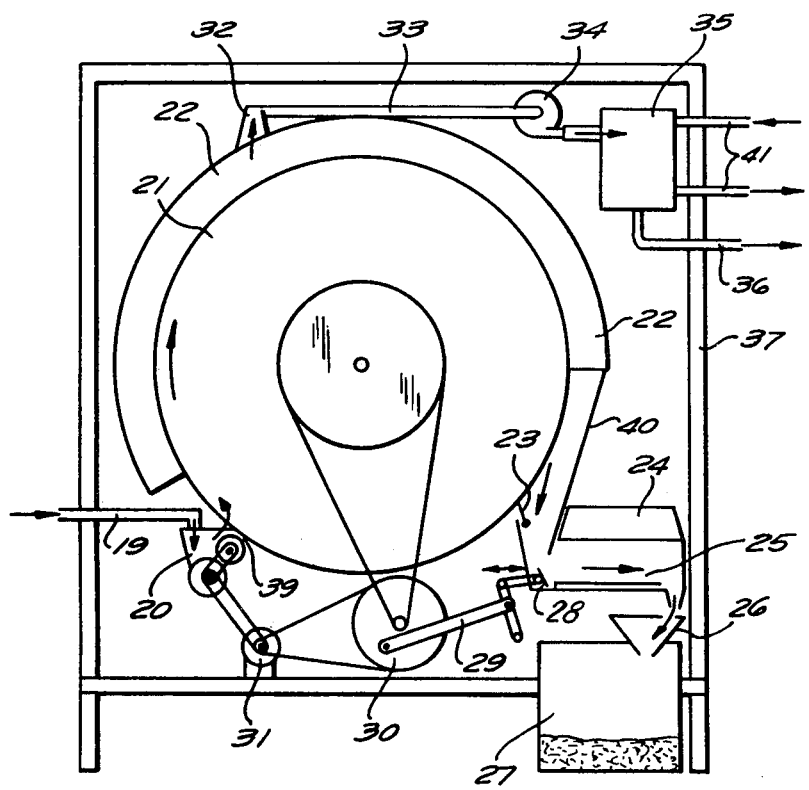
FIG. 4 is a diagrammatic side view of the other unit shown in FIG. 2.

According to FIG. 4 the device in apparatus B comprises an input transport device for thick sludge from apparatus A, which is connected with a sludge treatment and application device (20) consisting of one or several rotating cylinders with sludge containers, in which the sludge is homogenized and its consistency prepared so that it via a transferring ladle (39) is transferred in the form of a film with a thickness of 1-5 mm to the under side of a media carrier (21), in the present case made in the form of a space-saving cylindrical envelope surface. However, this carrier can be made in other ways, such as belts or mats driven between two or more cylinders. The media carrier (21) is driven by a controllable motor (31) which also drives the device 20. Partly enclosing the media carrier there is a drying device (22) in the present case made with the aid of an infrared radiation device which, however, can be replaced by other heating devices. The drying device (22) ends with a radiation screen (40). This device contains a scraping device (23) which is connected with a sintering device consisting of a collection and transport box (25) in which the scraped off granules of metal hydroxide via a scraper (28) and a linkage (29) as well as the wheel (30) driven by the motor (31) are compacted and concentrated so that sintering through heating, in the present case by means of the infrared radiation device (24) can be carried out effectively, so that the end product will be metal oxides in the form of granules or powder. A collection funnel (26) is connected with the box (25) and conveys the finished granulate to a suitable collection vessel (27). In connection with the drying device (22) and the heating device (24) there is a steam and hot air exhaust device, consisting of a connection funnel (32) with pipe (33) and a reciprocating pump (34) which is connected with a condenser/heat exchanger (35) and a condensate drain to the receiving body of water (36) and arrangements (41) for utilizing the heat.

The arrangement of apparatus B is enclosed in an apparatus housing (37).

We claim:

1. A method of converting metal hydroxides in sludge to a non-polluting product comprising: separating the sludge from waste water containing the metal hydroxide therein; dewatering said sludge to a thixotropic consistency; conveying the thixotropic sludge to a heating device; applying the thixotropic sludge in a thin layer having a thickness between about 1 mm. and 5 mm. onto a conveyor; conveying the thin layer of thixotropic sludge through the heating device and applying heat therein to thereby form small particles of metal hydroxide; scraping the small particles of metal hydroxide from the conveyor and transferring the small particles to a sintering device; compacting the small particles of metal hydroxide before sintering; and conveying the compacted metal hydroxide through the sintering device and applying heat therein to form a metal oxide in powder or granular form, said step of dewatering the sludge to a thixotropic consistency comprising forming a sludge having a water content greater than 85% by weight of the sludge.

2. The method according to claim 1, wherein said step of separating the sludge comprises forming a sludge having at least 96% water content by weight.

3. The method according to claim 2, further comprising collecting the metal oxide for subsequent treatment or removal.

4. The method according to claim 3, wherein said step of conveying the thin layer of thixotropic sludge through the heater comprises conveying the thin layer on a rotating drum.

* * * * *